United States Patent
Lee et al.

(10) Patent No.: US 10,477,574 B2
(45) Date of Patent: Nov. 12, 2019

(54) METHOD AND APPARATUS FOR PERFORMING CONTENTION BASED RANDOM ACCESS PROCEDURE OVER CONTENTION FREE RANDOM ACCESS PROCEDURE IN WIRELESS COMMUNICATION SYSTEM

(71) Applicant: LG ELECTRONICS INC., Seoul (KR)

(72) Inventors: Youngdae Lee, Seoul (KR); Seungjune Yi, Seoul (KR); Sangwon Kim, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/565,401

(22) PCT Filed: Apr. 11, 2016

(86) PCT No.: PCT/KR2016/003782
§ 371 (c)(1),
(2) Date: Oct. 9, 2017

(87) PCT Pub. No.: WO2016/163845
PCT Pub. Date: Oct. 13, 2016

(65) Prior Publication Data
US 2018/0124825 A1    May 3, 2018

Related U.S. Application Data

(60) Provisional application No. 62/145,524, filed on Apr. 10, 2015.

(51) Int. Cl.
*H04W 4/00* (2018.01)
*H04W 74/04* (2009.01)
(Continued)

(52) U.S. Cl.
CPC .......... *H04W 74/04* (2013.01); *H04W 48/16* (2013.01); *H04W 74/006* (2013.01); *H04W 74/085* (2013.01); *H04W 74/0808* (2013.01)

(58) Field of Classification Search
CPC ... H04W 52/365; H04W 16/02; H04W 52/34; H04W 72/04; H04W 72/042; H04W 72/0453
See application file for complete search history.

(56) References Cited

U.S. PATENT DOCUMENTS

| | | | |
|---|---|---|---|
| 2009/0285180 A1* | 11/2009 | Zhang | H04W 74/004 370/331 |
| 2011/0243048 A1* | 10/2011 | Wang | H04L 5/0051 370/311 |

(Continued)

FOREIGN PATENT DOCUMENTS

| | | |
|---|---|---|
| WO | 2012150809 | 11/2012 |
| WO | 2014059671 | 4/2014 |

OTHER PUBLICATIONS

Liao et al ("Listen-and-Talk: Full-duplex Cognitive Radio Networks", Jul. 2014).*

(Continued)

*Primary Examiner* — Abdelillah Elmejjarmi
(74) *Attorney, Agent, or Firm* — Lee, Hong, Degerman, Kang & Waimey

(57) ABSTRACT

A method and apparatus for performing a random access procedure in a wireless communication system is provided. A user equipment (UE) performs a contention free random access procedure on a first frequency, detects a failure of the contention free random access procedure, and performs a contention based random access procedure. When the first frequency is occupied by other media as a result of listen- (Continued)

before-talk (LBT) operation, the contention based random access procedure may be performed on a second frequency.

11 Claims, 16 Drawing Sheets

(51) Int. Cl.
*H04W 48/16* (2009.01)
*H04W 74/00* (2009.01)
*H04W 74/08* (2009.01)

(56) References Cited

U.S. PATENT DOCUMENTS

| | | | |
|---|---|---|---|
| 2012/0063302 A1 | 3/2012 | Damnjanovic et al. | |
| 2014/0086224 A1* | 3/2014 | Kwon | H04W 52/0219 370/336 |
| 2014/0219204 A1* | 8/2014 | Park | H04L 1/1822 370/329 |
| 2014/0362794 A1 | 12/2014 | Zhao et al. | |
| 2015/0043489 A1* | 2/2015 | Tseng | H04L 5/0098 370/329 |
| 2016/0095110 A1* | 3/2016 | Li | H04W 72/1215 370/329 |
| 2016/0234861 A1* | 8/2016 | Ye | H04W 74/0808 |
| 2017/0034853 A1* | 2/2017 | Rune | H04W 68/02 |
| 2018/0084540 A1* | 3/2018 | Takeda | H04L 5/0044 |

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol Specification (Release 12)," 3GPP TS 36.331 V12.5.0, Mar. 2015, 447 pages.

PCT International Application No. PCT/KR2016/003782, Written Opinion of the International Searching Authority dated Jul. 19, 2016, 2 pages.

* cited by examiner

METHOD AND APPARATUS FOR PERFORMING CONTENTION BASED RANDOM ACCESS PROCEDURE OVER CONTENTION FREE RANDOM ACCESS PROCEDURE IN WIRELESS COMMUNICATION SYSTEM

BACKGROUND OF THE INVENTION

Field of the Invention

The present invention relates to wireless communications, and more particularly, to a method and apparatus for performing a contention-based random access procedure over a contention-free random access procedure based on listen-before-talk (LBT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The fast uptake of LTE in different regions of the world shows both that demand for wireless broadband data is increasing, and that LTE is an extremely successful platform to meet that demand. At the same time, unlicensed spectrum has been more considered by cellular operators as a complementary tool to augment their service offering. Unlicensed spectrum can never match the qualities of the licensed regime. However, those solutions that allow an efficient use of unlicensed spectrum as a complement to licensed deployments have the potential to bring great value to 3GPP operators, and, ultimately, to the 3GPP industry as a whole. Given the widespread deployment and usage of other technologies in unlicensed spectrum for wireless communications in our society, it is envisioned that LTE would have to coexist with existing and future uses of unlicensed spectrum. Existing and new spectrum licensed for exclusive use by international mobile telecommunications (IMT) technologies will remain fundamental for providing seamless coverage, achieving the highest spectral efficiency, and ensuring the highest reliability of cellular networks through careful planning and deployment of high-quality network equipment and devices.

Complementing the LTE platform with unlicensed spectrum is a possible choice under these considerations, as it would enable operators and vendors to leverage the existing or planned investments in LTE/evolved packet core (EPC) hardware in the radio and core network, especially if licensed-assisted access (LAA) is considered a secondary component carrier integrated into LTE.

LAA may cause potential impact and/or issued on random access preamble transmission. Accordingly, a new mechanism to transmit a random access preamble in LAA environment may be required.

SUMMARY OF THE INVENTION

The present invention provides a method and apparatus for performing a contention-based random access procedure over a contention-free random access procedure based on listen-before-talk (LBT) in a wireless communication system. The present invention provides a new mechanism to transmit a random access preamble in licensed-assisted access (LAA) environment and get uplink synchronization.

In an aspect, a method for performing, by a user equipment (UE), a random access procedure in a wireless communication system is provided. The method includes performing a contention free random access procedure on a first frequency, detecting a failure of the contention free random access procedure, and performing a contention based random access procedure.

In another aspect, a user equipment (UE) in a wireless communication system is provided. The UE includes a memory, a transceiver, and a processor coupled to the memory and the transceiver. The processor is configured to perform a contention free random access procedure on a first frequency, detect a failure of the contention free random access procedure, and perform a contention based random access procedure.

In LAA, a random access preamble can be transmitted efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
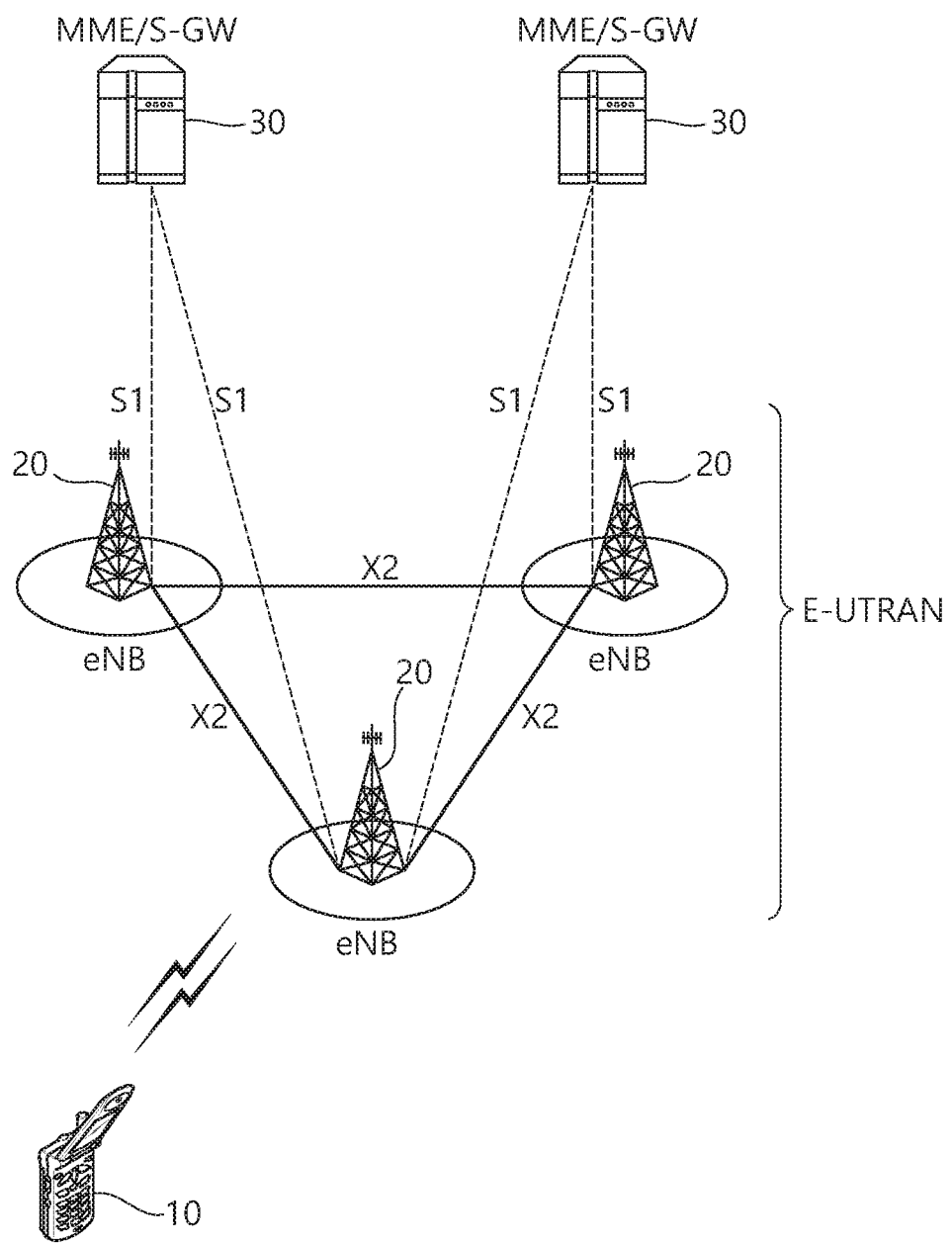
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an 51 interface.

Figure 2:
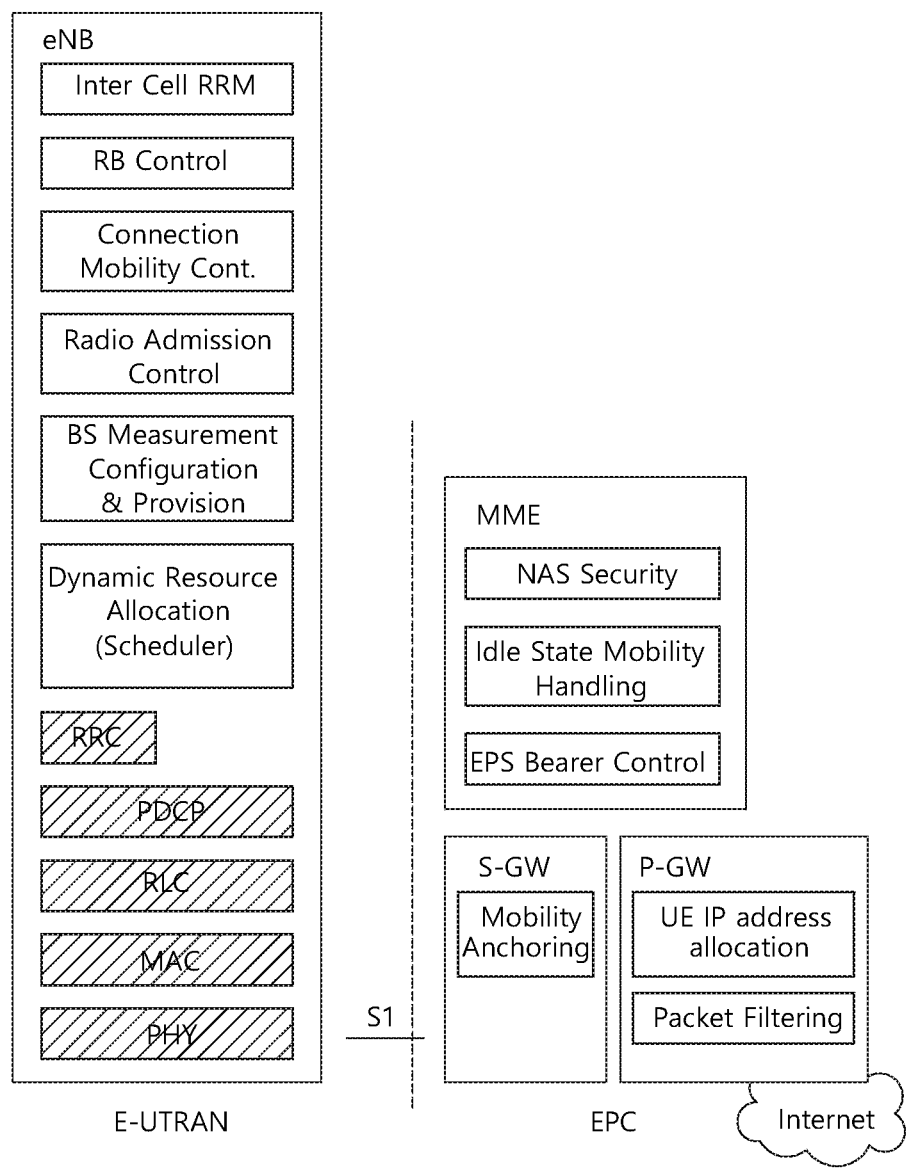
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
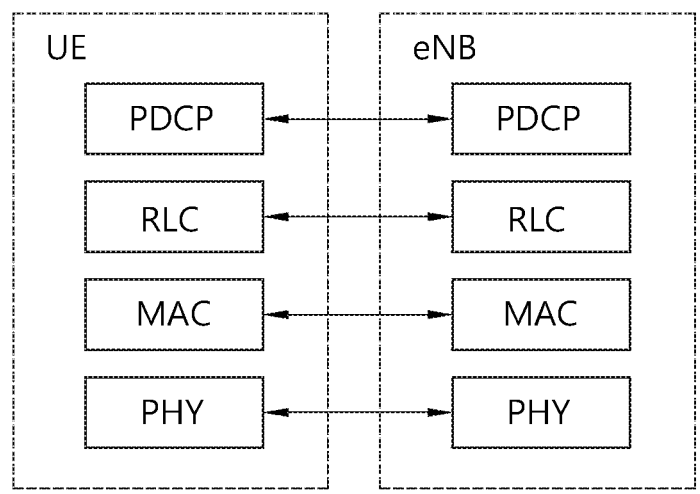
FIG. 3 shows a block diagram of a user plane protocol stack of an LTE system.
Figure 4:
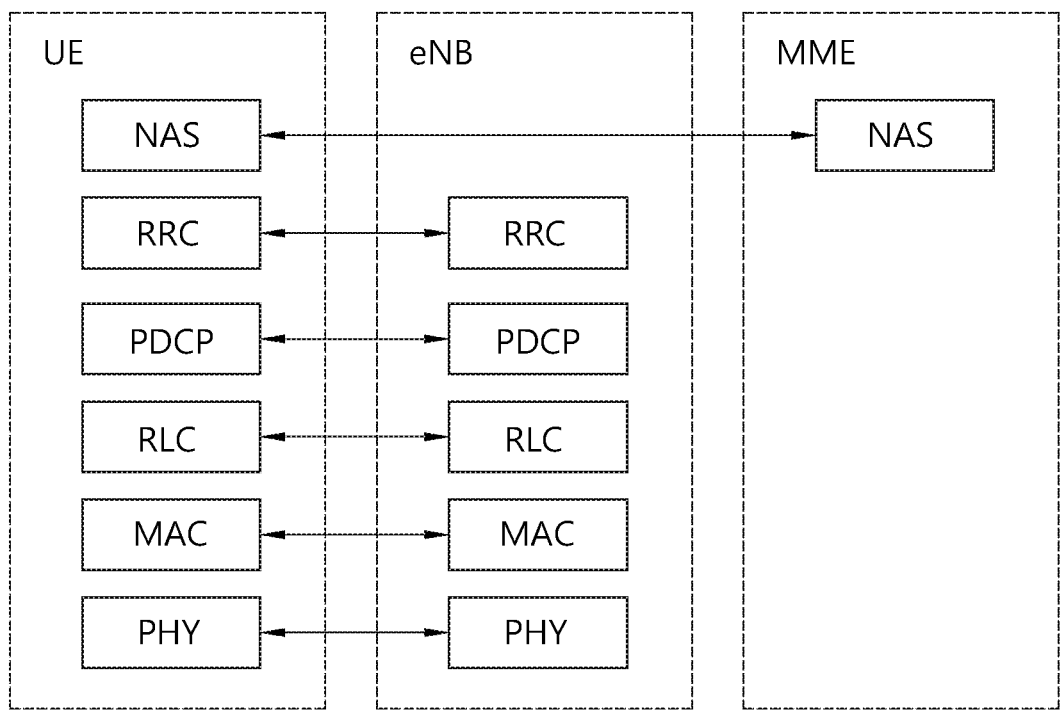
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
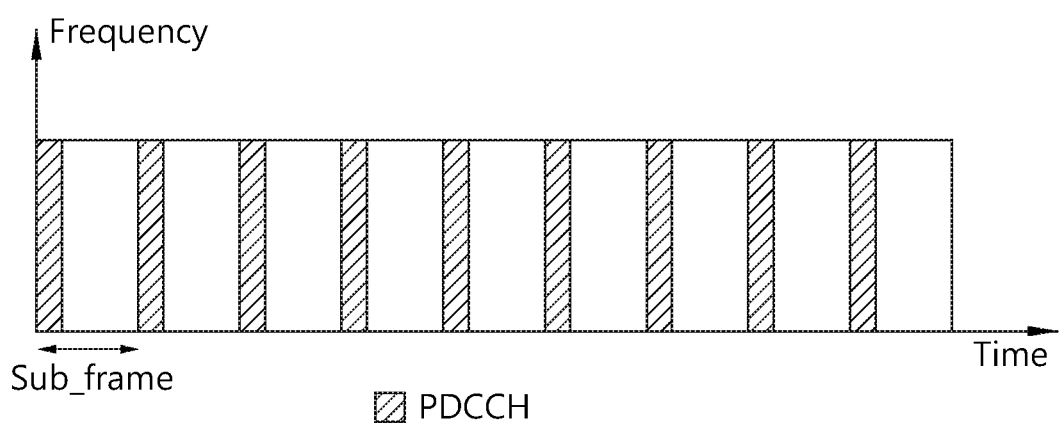
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Carrier aggregation (CA) is described. It may be referred to Section 5.5 and 7.5 of 3GPP TS 36.300 V12.5.0 (2015-03). In CA, two or more component carriers (CCs) are aggregated in order to support wider transmission bandwidths up to 100 MHz. A UE may simultaneously receive or transmit on one or multiple CCs depending on its capabilities. A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE.

CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

A random access procedure is described. It may be referred to Section 10.1.5 of 3GPP TS 36.300 V12.5.0 (2015-03).

The random access procedure is performed for the following events related to the PCell:
  Initial access from RRC_IDLE;
  RRC connection re-establishment procedure;
  Handover;
  DL data arrival during RRC_CONNECTED requiring random access procedure (e.g. when UL synchronization status is "non-synchronized");
  UL data arrival during RRC_CONNECTED requiring random access procedure (e.g. when UL synchronization status is "non-synchronized" or there are no PUCCH resources for scheduling request (SR) available);
  For positioning purpose during RRC_CONNECTED requiring random access procedure (e.g. when timing advance is needed for UE positioning).

The random access procedure is also performed on a SCell to establish time alignment for the corresponding secondary TAG (sTAG).

Furthermore, the random access procedure takes two distinct forms. Contention based random access procedure may be applicable to first five events described above. In the contention based random access procedure, the UE randomly selects a random access preamble from a particular set of random access preambles. Non-contention based (i.e. contention free) random access procedure may be applicable to only handover, DL data arrival, positioning and obtaining timing advance alignment for a sTAG. In the non-contention based random access procedure, the eNB allocates a designated (or dedicated) random access preamble to a particular UE. Difference between the two random access procedures lies in a generation of collision due to contention.

Figure 6:
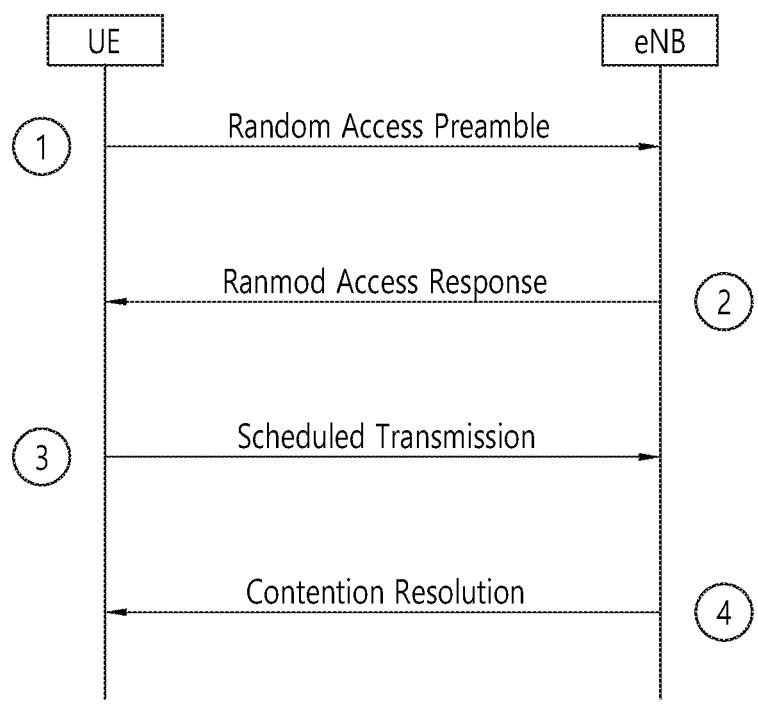
FIG. 6 shows a contention based random access procedure.

FIG. 6 shows a contention based random access procedure.

1. A random access preamble is transmitted on RACH in UL. A UE randomly selects one random access from a set of random access preambles indicated by system information or a handover command, selects a PRACH resource able to transmit the random access preamble, and transmits the same.

2. After the random access preamble is transmitted, the UE attempts to receive a random access response thereof generated by MAC on DL-SCH within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary cell radio network temporary identity (C-RNTI), and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits data stored in a buffer thereof or newly generated data to the BS by using the UL grant on UL-SCH. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Hereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

When CA is configured, the first three steps of the contention based random access procedures occur on the PCell while contention resolution may be cross-scheduled by the PCell.

Figure 7:
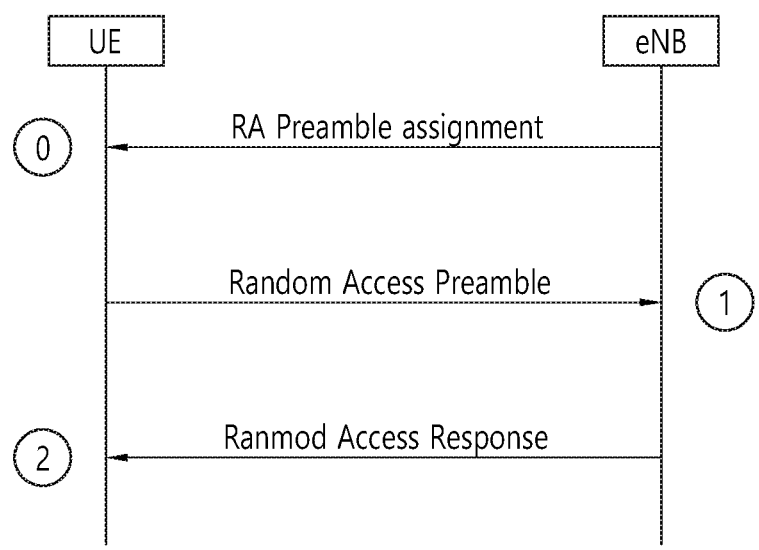
FIG. 7 shows a non-contention based random access procedure.

FIG. 7 shows a non-contention based random access procedure.

0. For the non-contention based random access procedure, it is important to receive a designated random access preamble eliminating a possibility of collision. A method of receiving an indication of the random access preamble includes a handover command and a PDCCH command.

1. After receiving the allocated random access preamble designated only for the UE, the UE transmits the preamble to the BS.

2. A method of receiving random access response information is the same as that in the contention-based random access procedure.

When performing non-contention based random access on the PCell while CA is configured, the random access preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and random access response (step 2) takes place on PCell.

Licensed-assisted access (LAA) is described. Carrier aggregation with at least one SCell operating in the unlicensed spectrum is referred to as LAA. In LAA, the configured set of serving cells for a UE therefore always may include at least one SCell operating in the unlicensed spectrum, also called LAA SCell. Unless otherwise specified, LAA SCells may act as regular SCells and may be limited to downlink transmissions.

LAA eNB may apply listen-before-talk (LBT) before performing a transmission on LAA SCell. When LBT is applied, the transmitter may listen to/sense the channel to determine whether the channel is free or busy. If the channel is determined to be free, the transmitter may perform the transmission. Otherwise, it may not perform the transmission. If an LAA eNB uses channel access signals of other technologies for the purpose of LAA channel access, it may continue to meet the LAA maximum energy detection threshold requirement.

Figure 8:
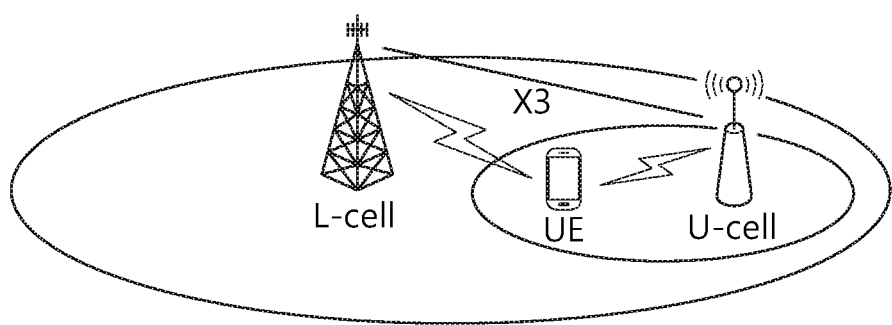
FIG. 8 shows an example of deployments of L-cell and U-cell.

FIG. 8 shows an example of deployments of L-cell and U-cell. L-cell means a cell uses resources on a licensed carrier, and U-cell means a cell uses resources on an unlicensed carrier. Referring to FIG. 8, the UE is connected to the L-cell as PCell or primary SCell (PSCell). The UE may be configured with one or more L-cells on L-frequencies (frequencies of licensed spectrum) and one or more U-cells on U-frequencies (frequencies of unlicensed spectrum). The same eNB may control both L-cell and U-cell, or different eNBs may control L-cell and U-cell, respectively. Namely, L-cell and U-cell may belong to one eNB or different eNBs. Inter-eNB interface, which may be called X3 interface, may be defined in case of different eNBs controlling L-cell and U-cell, respectively.

Figure 9:
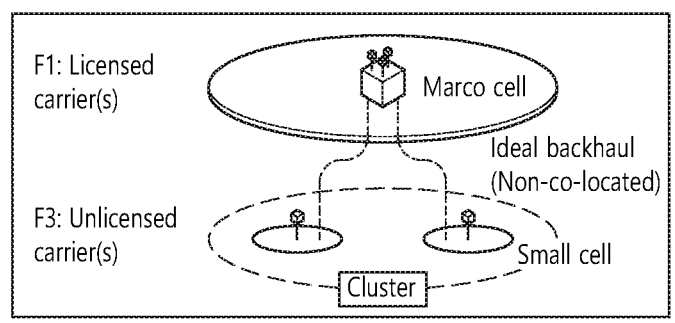
FIG. 9 shows an example of a deployment scenario for LAA.

FIG. 9 shows an example of a deployment scenario for LAA. Referring to FIG. 9, carrier aggregation between licensed macro cell (F1) and unlicensed small cell (F3) is configured. Specifically, a macro cell uses resources on a licensed carrier at frequency F1. Multiple small cells use resources on an unlicensed carrier at frequency F3. The macro cell and multiple small cells are connected via ideal backhaul. The macro cell and multiple small cells are non-collocated.

Figure 10:
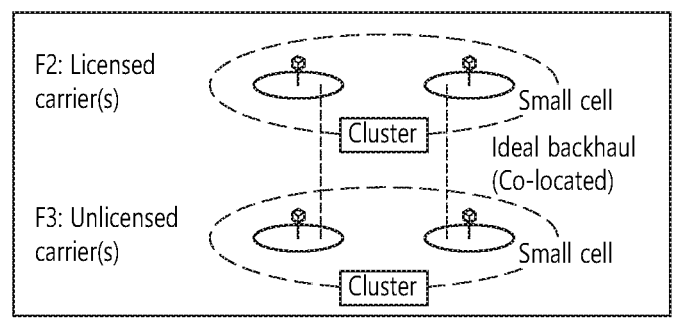
FIG. 10 shows another example of a deployment scenario for LAA.

FIG. 10 shows another example of a deployment scenario for LAA. Referring to FIG. 10, carrier aggregation between licensed small cell (F2) and unlicensed small cell (F3) without macro cell coverage is configured. Specifically, a first set of small cells use resources on a licensed carrier at frequency F2. A second set of small cells use resources on an unlicensed carrier at frequency F3. The first set of small cells and the second set of small cells are connected via ideal backhaul. The first set of small cells and the second set of small cells are collocated.

Figure 11:
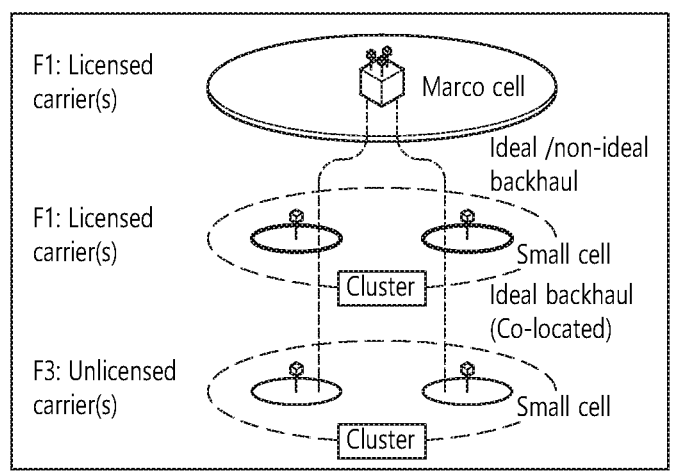
FIG. 11 shows another example of a deployment scenario for LAA.

FIG. 11 shows another example of a deployment scenario for LAA. Referring to FIG. 11, licensed macro cell and small cell (F1), with carrier aggregation between licensed small cell (F1) and unlicensed small cell (F3) are configured. Specifically, a macro cell uses resources on a licensed carrier at frequency F1. A first set of small cells use resources on a licensed carrier at frequency F1. The macro cell and the first set of small cells are connected via ideal or non-ideal backhaul. Further, a second set of small cells use resources on an unlicensed carrier at frequency F3. The first set of small cells and the second set of small cells are connected via ideal backhaul. The first set of small cells and the second set of small cells are collocated.

Figure 12:
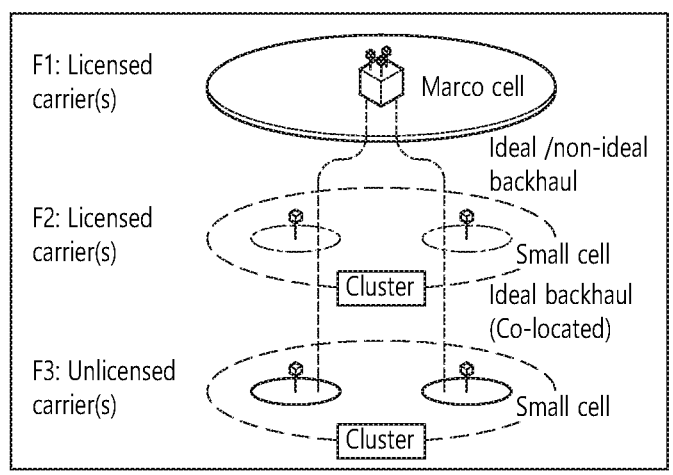
FIG. 12 shows another example of a deployment scenario for LAA.

FIG. 12 shows another example of a deployment scenario for LAA. Referring to FIG. 12, licensed macro cell (F1), licensed small cell (F2) and unlicensed small cell (F3) are configured. Carrier aggregation between licensed small cell (F2) and unlicensed small cell (F3) is configured. If there is ideal backhaul between macro cell and small cell, there may be carrier aggregation between macro cell (F1), licensed small cell (F2) and unlicensed small cell (F3). If dual connectivity is enabled, there may be dual connectivity between macro cell and small cell. Specifically, a macro cell uses resources on a licensed carrier at frequency F1. A first set of small cells use resources on a licensed carrier at frequency F2. The macro cell and the first set of small cells are connected via ideal or non-ideal backhaul. Further, a second set of small cells use resources on an unlicensed carrier at frequency F3. The first set of small cells and the second set of small cells are connected via ideal backhaul. The first set of small cells and the second set of small cells are collocated.

As described above, an LAA carrier which is non-collocated may be aggregated with the PCell. To aggregate non-collocated cells, the UE should have separate time advance values. Therefore, the random access procedure on LAA carrier should be supported. In Rel-12, only contention free random access procedure is supported on SCells. Accordingly, only contention free random access procedure may also be sufficient for LAA carrier. Also in Rel-12, the random access response is transmitted only on the PCell, which also be assumed for contention free random access procedure on LAA carrier.

Figure 13:
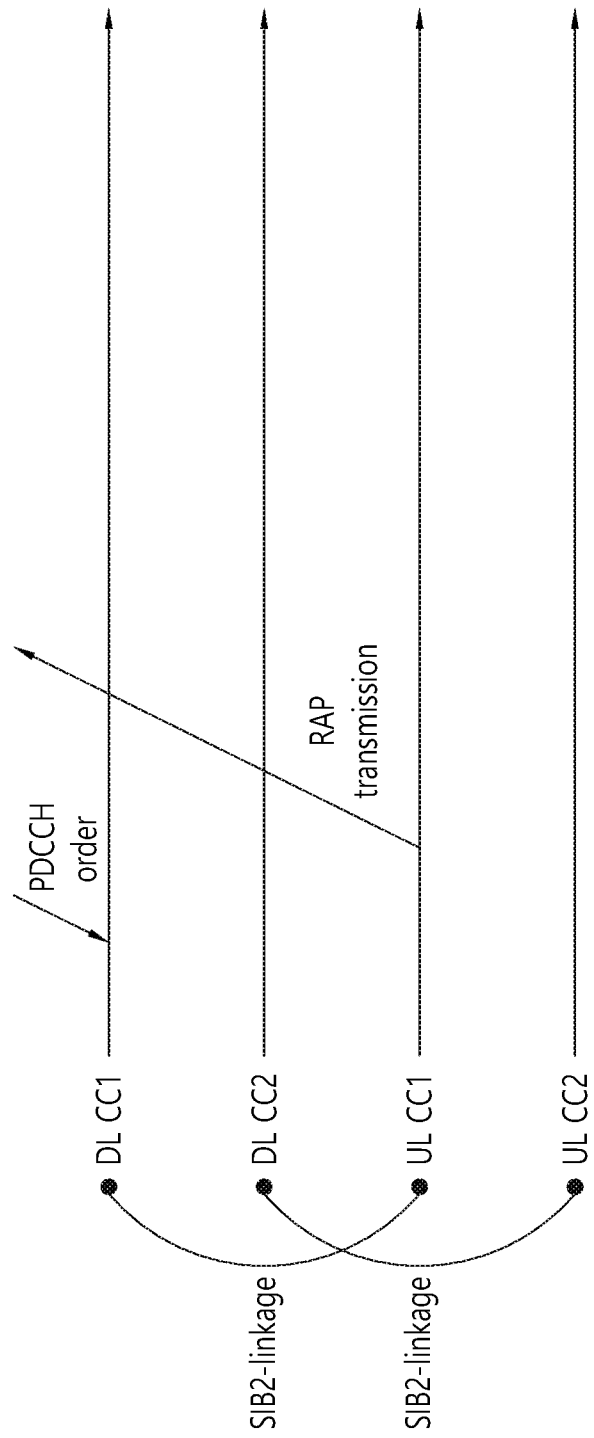
FIG. 13 shows an example of a contention free random access procedure.

FIG. 13 shows an example of a contention free random access procedure. For contention free random access procedure, up to Rel-12, the eNB transmits PDCCH order (i.e. step 0) to trigger a contention free random access on a concerned cell. When the UE receives the PDCCH order on a cell, the UE triggers a contention free random access on the cell on which the UE received the PDCCH order by using the indicated random access preamble. Referring to FIG. 13, the PDCCH order for contention free random access procedure is received on DL CC 1. Accordingly, the random access preamble is transmitted on UL CC 1, which has a SIB2-linkage with DL CC 1. The DL cell is associated with a UL cell as indicated by the eNB through SIB2. The UL cell associated with the DL cell is called SIB2-linked UL cell.

For contention free random access procedure on LAA carrier, LBT may cause a potential impact/issue on random access preamble transmission on LAA carrier. As described above, LBT mechanism is used where the transmitter scans the frequency to determine whether it is occupied or not. Although the transmitter starts the data transmission after determining that the unlicensed cell is not occupied, the transmitter may only use the unlicensed cell up to the maximum occupancy time, e.g. 10 ms.

For example, when the eNB transmits a PDCCH order to the UE for UL synchronization, the UE may trigger contention free random access procedure on a cell which is on an unlicensed frequency. However, if the cell is occupied by other media, the UE may not be able to transmit the random access preamble on the cell. In this case, the UE may drop the random access preamble transmission and not increase the preamble transmission counter/power while expecting to transmit the random access preamble soon again. However, in LAA, it may be difficult to expect that the UE can use the cell soon, which results in undesirable delay on data transmission on that cell. Accordingly, in order to solve the problem described above, a new mechanism may be required to transmit the random access preamble in LAA and get UL synchronization.

Figure 14:
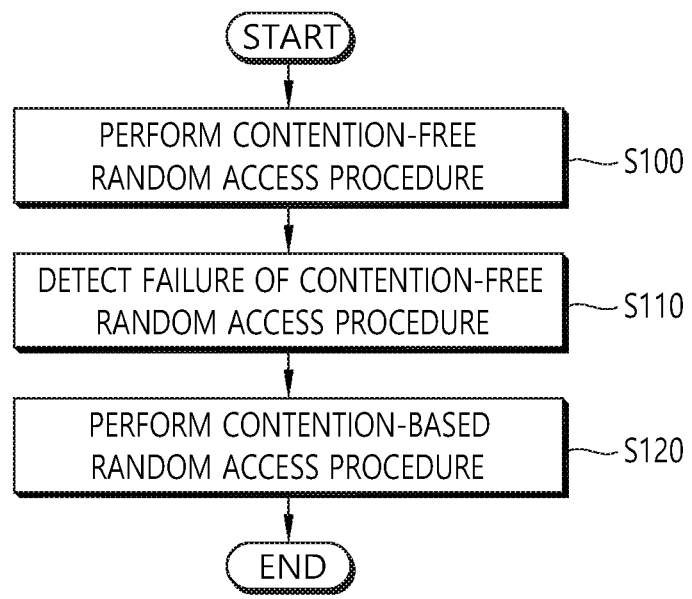
FIG. 14 show a method for performing a random access procedure according to an embodiment of the present invention.

FIG. 14 show a method for performing a random access procedure according to an embodiment of the present invention. According to this embodiment of the present invention, the UE may change from a contention free random access procedure (with the indicated random access preamble) on the first uplink carrier to a contention based random access procedure (with randomly selected preamble) on the second uplink carrier as a result of LBT either in the middle of preamble retransmissions during an ongoing random access procedure or as a new random access procedure.

In step S100, the UE performs a contention free random access procedure. In the contention free random access procedure, the eNB transmits a PDCCH order indicating the ra-PreambleIndex with a value different from 000000 (i.e. dedicated random access preamble) to the UE on a DL cell of a first frequency. The eNB may configure the UE with at least one TAG to which at least two UL cells belong. Upon receiving the PDCCH order on the DL cell of the first frequency that triggers the contention free random access procedure, the UE transmits a dedicated random access preamble, indicated by the PDCCH order, to the network on a UL cell of the first frequency. The UE may transmit the dedicated random access preamble on one of unoccupied UL cells in a TAG, where the TAG includes a UL cell associated with the DL cell on which the UE receives the PDCCH order. A timer may be configured for validity of the indicated random access preamble. Thus, the UE may continue to perform the contention free random access procedure on the first frequency until the timer expires. The timer may be configured per unlicensed cell or per UL carrier by a UE dedicated signaling or system information.

In step S110, the UE detects a failure of the contention free random access procedure. The eNB and the UE may determine whether a cell is occupied or not by other media before transmitting data on the cell, i.e. LBT. If the cell is occupied by other media, the UE may determine that the contention free random access procedure has failed. [95] In step S120, the UE performs a contention based random access procedure, even though the UE is assigned the dedicated random access preamble indicated by the PDCCH order. In the contention based random access procedure, the UE randomly selects a random access preamble and performs retransmission of the selected random access preamble. That, is the UE changes from the contention free random access procedure to the contention based random access procedure, as a result of LBT.

Specifically, the UE may perform one of the following options when the UE detects that the first frequency is occupied.

(1) The UE may randomly select a random access preamble for a second frequency and perform retransmission of the selected random access preamble on the second frequency because the second frequency is not occupied.

(2) Alternatively, the UE may randomly selects a random access preamble for the first frequency and perform retransmission of the selected random access preamble on the first frequency.

(3) Alternatively, if the UE loses chance to re-transmit the indicated random access preamble with ramped transmitting power P1, the UE may wait until the UE detects the next chance to transmit on the first frequency based on LBT. Until the timer expires, the UE may perform re-transmission of the indicated random access preamble on the first frequency with transmitting power P1. The UE may continue to perform re-transmission of the indicated random access preamble on the first frequency with power ramping. If the timer expires, the UE randomly may select a random access preamble for either the first frequency or second frequency and perform retransmission of the selected random access preamble on either the first frequency or the second frequency with power ramping.

(4) Alternatively, the UE may stop the contention free random access procedure, and initiate the contention based random access procedure. Namely, if the contention free random access procedure fails on the first frequency, the UE may perform contention based random access procedure on either the first frequency or the second frequency based on LBT.

(5) Alternatively, if the UE loses chance to re-transmit the indicated random access preamble with ramped transmitting power P1, the UE may wait until the UE detects the next chance to transmit on the first frequency based on LBT. Until the timer expires, the UE may perform re-transmission of the indicated random access preamble on the first frequency with transmitting power P1. The UE may continue to perform re-transmission of the indicated random access preamble on the first frequency with power ramping. If the timer expires, the UE may stop the contention free random access procedure. Then, the UE may initiate the contention based random access procedure on either the first frequency or the second frequency. In this new contention based random access procedure, the UE may randomly select a random access preamble for either the first frequency or second frequency and perform retransmission of the selected random access preamble on either the first frequency or the second frequency with power ramping based on LBT.

Figure 15:
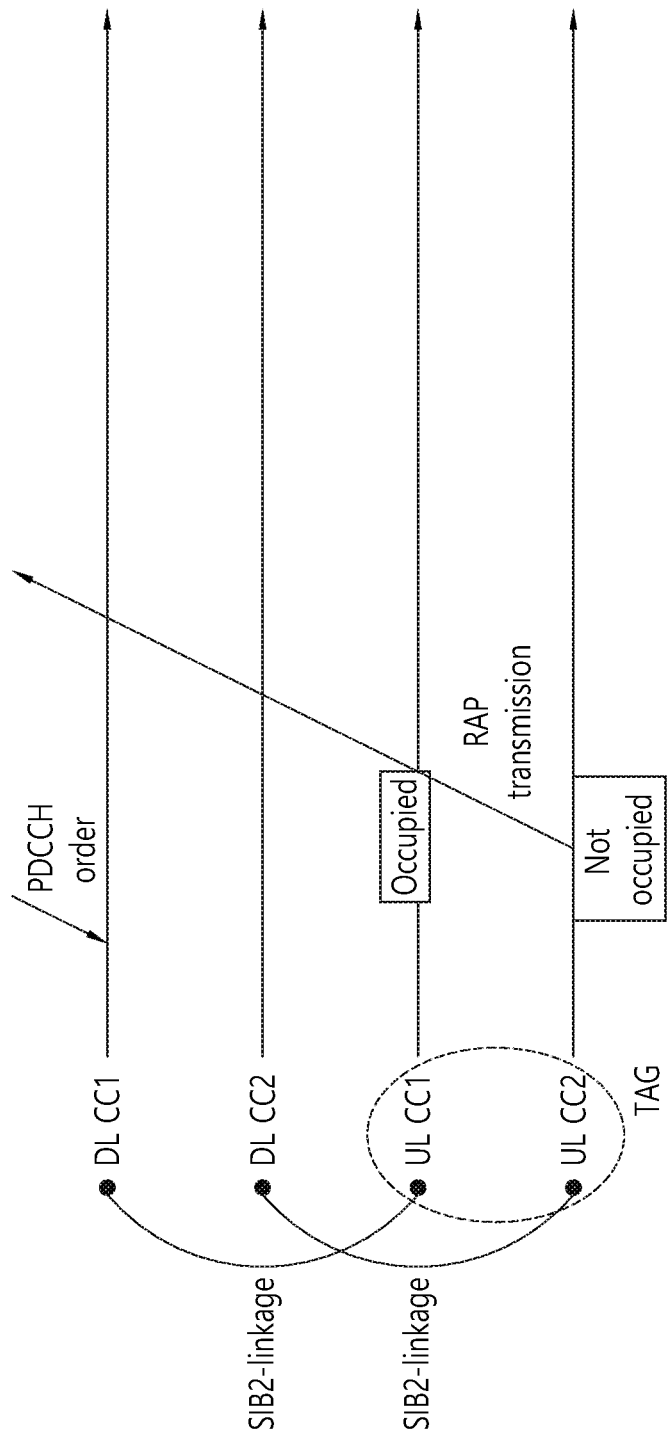
FIG. 15 shows an example of transmission of a random access preamble according to an embodiment of the present invention.

FIG. 15 shows an example of transmission of a random access preamble according to an embodiment of the present invention. It is assumed that the UE is configured with DL CC1, DL CC2, UL CC1, and UL CC2. It is assumed that UL CC 1 is associated with the DL CC1 while UL CC2 is associated with the DL CC2 by the eNB via SIB2. It is assumed that UL CC1 and UL CC2 belong to the same TAG.

The UE receives a PDCCH order on DL CC1, which triggers a contention free random access procedure by indicating a dedicated random access preamble. The UE checks the TAG to which UL CC1 belongs to. In the TAG, for UL CC1 and UL CC2, the UE checks whether UL CC1 and UL CC2 are occupied or not by other media.

The UE initiates a contention free random access procedure on UL CC1. The UE may start a timer and transmit the dedicated random access preamble, indicated by the PDCCH order, on UL CC1. But, the UE does not receive a random access response for the dedicated random access preamble. The UE detects that UL CC1 is occupied while UL CC2 is not occupied as a result of LBT.

Accordingly, the UE randomly selects a random access preamble and performs retransmission of the selected random access preamble. That is, the UE changes from the contention free random access procedure to the contention based random access procedure, as a result of LBT. Specifically, the UE may perform one of the following options when the UE detects that UL CC1 is occupied.

(1) The UE may randomly select a random access preamble for UL CC2 and perform retransmission of the selected random access preamble on UL CC2 because UL CC2 is not occupied.

(2) Alternatively, the UE may randomly select a random access preamble for UL CC1 and perform retransmission of the selected random access preamble on UL CC1.

(3) Alternatively, if the UE loses chance to re-transmit the indicated random access preamble with ramped transmitting power P1, the UE may wait until the UE detects the next chance to transmit on UL CC1 based on LBT. Until the timer expires, the UE may perform re-transmission of the indicated random access preamble on UL CC1 with transmitting power P1. The UE may continue to perform re-transmission of the indicated random access preamble on UL CC1 with power ramping. If the timer expires, the UE may randomly select a random access preamble for either UL CC1 or UL CC2 and perform retransmission of the selected random access preamble on either UL CC1 or the UL CC2 with power ramping.

(4) Alternatively, the UE may stop the contention free random access procedure, and initiate the contention based random access procedure. Namely, if the contention free random access procedure fails on UL CC1, the UE may perform the contention based random access procedure on either UL CC1 or UL CC2 based on LBT.

(5) Alternatively, if the UE loses chance to re-transmit the indicated random access preamble with ramped transmitting power P1, the UE may wait until the UE detects the next chance to transmit on UL CC1 based on LBT. Until the timer expires, the UE may perform re-transmission of the indicated random access preamble on UL CC1 with transmitting power P1. The UE may continue to perform re-transmission of the indicated random access preamble on UL CC1 with power ramping. If the timer expires, the UE may randomly select a random access preamble for either UL CC1 or UL CC2 and perform retransmission of the selected random access preamble on either UL CC1 or the UL CC2 with power ramping. If the timer expires, the UE may stop the contention free random access procedure. Then, the UE may initiate the contention based random access procedure on either UL CC1 or UL CC2. In this new random access procedure, the UE may randomly select a random access preamble for either UL CC1 or UL CC2 and perform retransmission of the selected random access preamble on either UL CC1 or UL CC2 with power ramping based on LBT.

Figure 16:
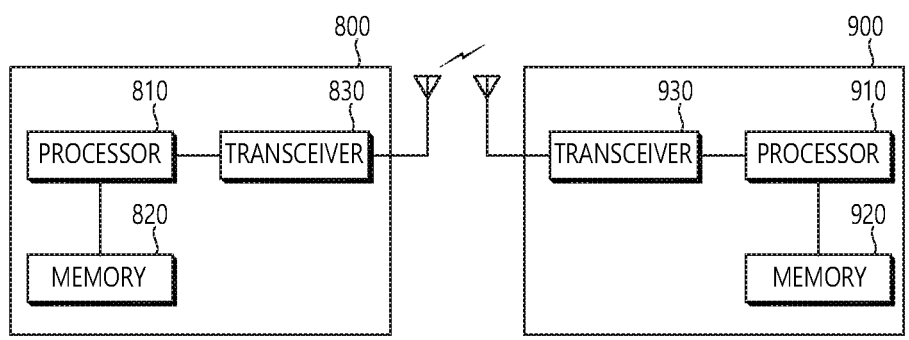
FIG. 16 shows a wireless communication system to implement an embodiment of the present invention.

FIG. 16 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may perform a contention free random access procedure, detect a failure of the contention free random access procedure, and perform a contention based random access procedure. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
   receiving a physical downlink control channel (PDCCH) order related to a dedicated random access preamble for a contention free random access procedure from a network on a first downlink component carrier (DL CC) of a first frequency;
   transmitting the dedicated random access preamble for the contention free random access procedure to the network on a first uplink component carrier (UL CC) linked to the first DL CC;
   starting a timer related to the contention free random access procedure;
   performing a listen-before-talk (LBT) operation, while the timer is running;
   detecting that the first UL CC is occupied by other media and that a second UL CC is not occupied as a result of the LBT operation;
   re-transmitting the dedicated random access preamble for the contention free random access procedure on the first UL CC with power ramping, until the timer related to the contention free random access procedure expires, in response to detecting that the first UL CC is occupied by other media; and
   initiating a contention based random access procedure on the second UL CC in response to detecting that the second UL CC is not occupied, when the timer related to the contention free random access procedure expires, wherein the timer is configured per unlicensed cell or per UL CC.

2. The method of claim 1, wherein the first DL CC of the first frequency is associated with the first UL CC linked to the first DL CC via a system information block 2 (SIB 2).

3. The method of claim 1, wherein the first UL CC linked to the first DL CC is one of unoccupied uplink (UL) cells in a timing advance group (TAG).

4. The method of claim 1, wherein the contention based random access procedure is performed on a second frequency, which is not occupied by other media.

5. The method of claim 4, wherein performing the contention based random access procedure on the second frequency comprises: randomly selecting a random access preamble; and transmitting the randomly selected random access preamble to the network on the second UL CC of the second frequency.

6. The method of claim 1, wherein the contention based random access procedure is performed on the first frequency.

7. The method of claim 1, wherein the timer is configured for validity of the dedicated random access preamble.

8. The method of claim 7, wherein performing the contention free random access procedure on the first frequency continues until the timer expires.

9. The method of claim 1, wherein the UE is configured with at least one TAG to which at least two UL cells belong.

10. The method of claim 1, wherein the first frequency corresponds to an unlicensed carrier.

11. A user equipment (UE) in a wireless communication system, the UE comprising: a memory; a transceiver; and a processor coupled to the memory and the transceiver, wherein the processor is configured to:
    control the transceiver to receive a physical downlink control channel (PDCCH) order related to a dedicated random access preamble for a contention free random access procedure from a network on a first downlink component carrier (DL CC) of a first frequency;
    control the transceiver to transmit the dedicated random access preamble for the contention free random access procedure to the network on a first uplink component carrier (UL CC) linked to the first DL CC;
    start a timer related to the contention free random access procedure;
    perform a listen-before-talk (LBT) operation, while the timer is running;
    detect that the first UL CC is occupied by other media and that a second UL CC is not occupied as a result of the LBT operation;
    control the transceiver to re-transmit the dedicated random access preamble for the contention free random access procedure on the first UL CC with power ramping, until the timer related to the contention free random access procedure expires, in response to detecting that the first UL CC is occupied by other media; and
    initiate a contention based random access procedure on the second UL CC in response to detecting that the second UL CC is not occupied, when the timer related to the contention free random access procedure expires, wherein the timer is configured per unlicensed cell or per UL CC.

* * * * *